Aug. 6, 1940.  B. J. CRAIG  2,210,230
AUTOMOTIVE VEHICLE DOOR CONTROL
Filed Jan. 20, 1940
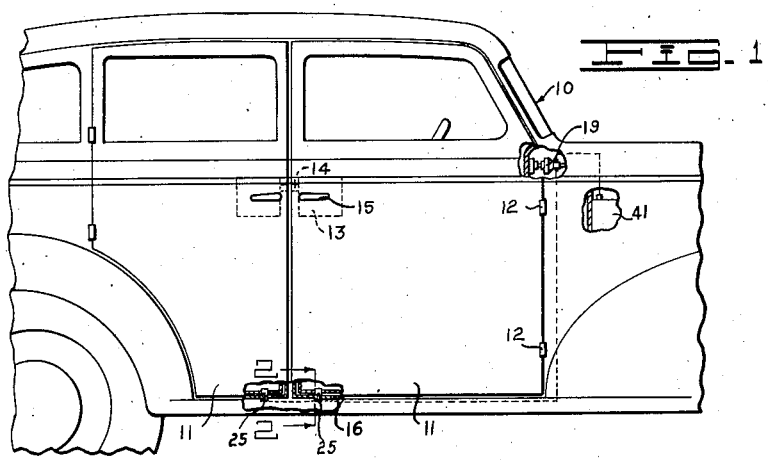
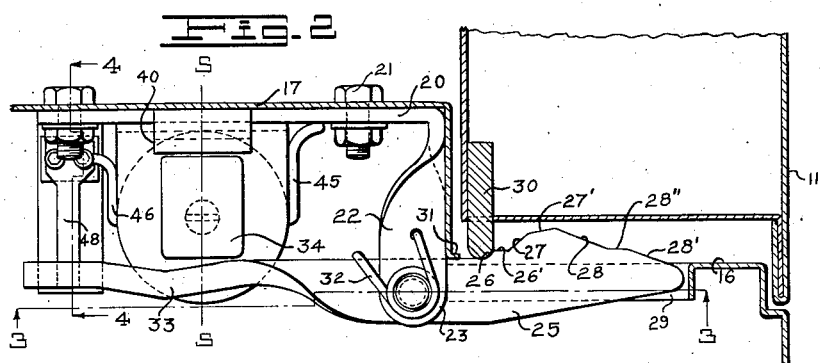
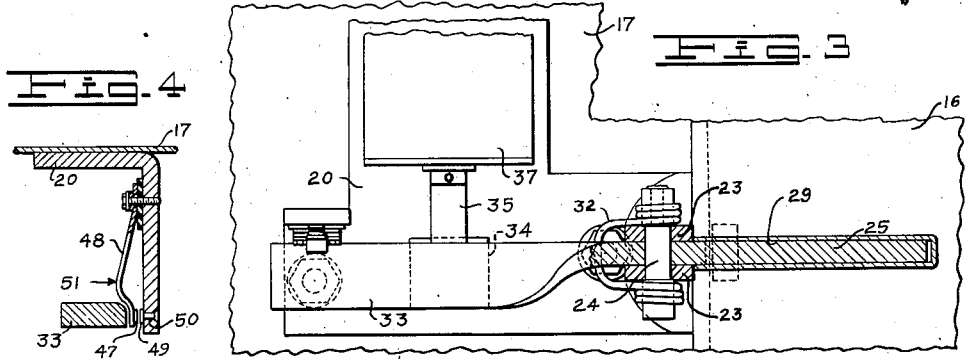
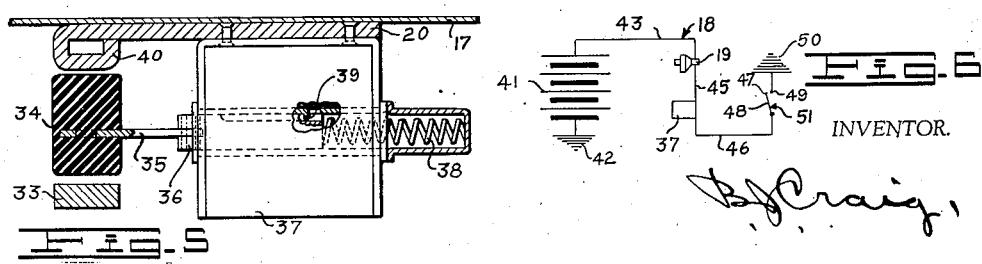
INVENTOR.
B. J. Craig Patented Aug. 6, 1940

2,210,230

UNITED STATES PATENT OFFICE 2,210,230

AUTOMOTIVE VEHICLE DOOR CONTROL

Burnie J. Craig, Los Angeles County, Calif.

Application January 20, 1940, Serial No. 314,851

14 Claims. (Cl. 180—82)

This invention relates to door latching and control mechanism and is particularly, although not exclusively, adapted for use with the doors of automotive vehicles, and a general object is to provide a construction which includes cooperating parts mounted on the door and/or frame, and/or door supporting means, and arranged so that a maximum of safety may be secured in door operation.

A more specific object of the invention is to provide a door construction for an automotive vehicle including a check member which permits the door to be opened readily after the latch bolt is released but which can be conditioned to offer resistance to door opening.

Another object of the invention is to provide a novel automotive vehicle door control means wherein a vehicle speed influenced member allows easy opening of the door after the bolt is released but which, when the vehicle is operating above a predetermined speed, requires exertion of considerable force in order to open the door. With a construction of this character the bolt release member may be of such character that a very light pressure, such as could be exerted by a finger tip, may be employed to release the bolt since the release of the bolt with the present invention while the vehicle is running does not allow the door to be opened without the application of a heavy force upon the door. Should, however, the vehicle speed be below the certain rate there would be no added resistance offered to full opening of the door.

As a result of the described construction, likelihood of children or thoughtless persons opening the door, while it is dangerous to do so, is avoided, while the objection of riders who refuse to ride in a vehicle with locked doors is overcome.

An additional object of the invention is to provide a novel vehicle speed controlled door check member.

Other objects and advantages of the invention will be apparent from the following description taken in connection with its accompanying drawing, wherein:

Fig. 1 is a fragmentary side elevation of an automotive vehicle equipped with a safety door check embodying the features of the present invention;

Fig. 2 is a fragmentary sectional view taken on line 2—2, Fig. 1;

Fig. 3 is a sectional view taken on line 3—3, Fig. 2;

Fig. 4 is a sectional view taken on line 4—4, Fig. 2;

Fig. 5 is a sectional view taken on line 5—5, Fig. 2; and

Fig. 6 is a wiring diagram.

Referring to the drawing by reference characters the invention is shown as embodied in a construction which includes an automotive vehicle body 10, including doors 11 shown as mounted on hinges 12 and adapted to be held in closed position by latches 13 each of which includes a bolt 14 and a release member, such as a handle 15.

The construction shown includes door sills 16 and a floor 17 and also includes a circuit 18, which includes a suitable vehicle speed responsive circuit closing member 19 through which the circuit is closed when the vehicle speed is below a certain rate. The member 19 may be of any suitable character and, for instance, may be of the type disclosed in United States Patent No. 2,187,933, granted January 23, 1940.

The construction shown includes a base 20 secured in place by bolts 21, and including a pair of spaced downwardly extending arms 22 which are turned through 90° to provide parallel portions 23 which receive a pivot pin 24 for pivotally mounting a check member 25.

The check member at its forward end includes a cam portion shown as consisting of camming surfaces 26, 27, 28, and 28' and the upper portion of the forward end of the check member projects through a slot 20 in the sill 16 into the path of movement of a trip member 30 shown as secured to and projecting below the bottom inner edge of a door. The check member 25 is normally urged into engagement with a stop 31 by means of a spring 32.

The rear portion 33 of the check member is bent at right angles to the forward portion and when swung about its pivot engages a compressible bumper member 34, which may be made of rubber, and which is mounted on the forward end of a spring leaf member 35, the rear end of which is secured to the forward end of a core member 36 of a solenoid 37. The core member is normally urged forward by a spring 38 and is prevented from turning as it reciprocates by a pin and slot guide 39.

The base 20 includes a portion bent to form an anvil 40 which is engaged by the bumper 34 when the latter is moved by the rear end 33 of the check member.

The circuit 18 shown includes a source of current 41, one side of which is grounded at 42 and the other side of which is connected by a lead 43 with one side of the speed controlled switch 19. The other side of the speed controlled switch is connected by a lead 45 to one terminal of the solenoid 37, the other terminal of the solenoid being connected by a lead 46 with a contact 47 mounted on an insulated resilient arm 48 on the base 20. The contact 47 is spaced from a companion contact 49 which is grounded at 50.

The above described assembly provides a switch 51 to close the solenoid circuit.

The end 33 of the check member includes a rounded portion which when the check member is first moved engages the switch 51 and closes the circuit.

Assuming that the door is closed and that the vehicle is at rest or is running at such a low speed that the circuit is closed through the speed controlled member 19. When the latch bolt is released and the door is first opened the trip 30 engages the cam surface 26 and rocks the check member 25. This first closes the circuit through contacts 47 and 49 so that the solenoid is energized and the bumper 34 is drawn from the path of the rear end 33 of the check member. The check member is then free to be moved down by the trip 30 so that there is no resistance to the opening of the door when the latter is opened and the check member is further rocked.

Should, however, the door bolt be released and the door be moved toward open position when the vehicle is running at a speed such that the circuit through the speed influenced member 19 is open, then under such conditions the shifting of the check member 25 by engagement of the cam 26 with the trip 30 although it will close the circuit across contacts 47 and 49, will not energize the solenoid 37 since the circuit remains open through the speed influenced member 19. The bumper 34 therefore will not be withdrawn and as the door is pushed the trip member 30 rides across a dwell portion 26' between the cams 26 and 27 and then rides up the cam surface 27 on the check member and compresses the bumper 34 and further opening of the door can then be accomplished only by exerting heavy force upon the door so that the bumper 34 is compressed sufficiently to permit the trip 30 to pass over the highest point of the cam 27, after which the trip member passes onto the relatively flat portion 27' between cams 27 and 28. The pressure required to open the door is thus gradually increased until the trip 30 engages the portion 27, after which the force required remains substantially the same until the trip 30 passes onto the cam portion 28, whereupon the force required to open the door is gradually lessened. Thus the force required is not suddenly released and this tends to prevent sudden opening of the door after the effect of the check has ceased.

In closing the door when the vehicle is at rest, the trip 30 engages the cam portion 28' thus rocking the check member 25 and first closing the circuit through the contacts 47 and 49 to thereby energize the solenoid and withdraw the bumper 34, so that easy closing is effected. Should the vehicle be running when the door is to be closed— an unlikely occurrence—it will be necessary to slam the door sufficiently hard to cause the check member to compress the bumper 34. A dwell portion 28'' between cams 28 and 28' engages the trip 30 to thus allow the solenoid to act before the trip passes to the cam 28. Too sudden closing of the door makes such action require considerable force whereas a slow closing can be easily effected so that this present construction has the added advantage in that it tends to discourage hard slamming of the doors.

Having thus described my invention I claim:

1. In an automotive vehicle construction, a body member, a door member movably mounted on the body member, a bolt on one of the members movable to engage the other member to hold the door member closed, means independent of the bolt to restrain opening movement of the door, and means responsive to the speed of the vehicle to vary the force required to overcome the restraining means so that door opening requires the application of a light force or a heavy force.

2. In a door construction for an automotive vehicle, a door movable to open position, means to restrain opening movement of the door, and vehicle speed controlled means to vary the force required to overcome the door restraining means.

3. In an automotive vehicle door construction, a bolt, means operable to a position to release the bolt, means to restrain opening of the door after the bolt is released and operable at all times to permit the door to open, and vehicle speed controlled means independent of the bolt to control the force required to overcome the restraining means.

4. In an automotive vehicle construction, a door movable to open and closed positions, a bolt for holding the door closed, means operable when the bolt is disengaged to restrain opening movement of the door from closed position and door movement actuated, vehicle speed controlled, means operable to release the restraining means.

5. In an automotive vehicle door construction including a body member and a door member movable to open and closed positions, means to restrain movement of the door, and vehicle speed controlled, electro-magnetically operated means to vary the effect of the restraining means so that movement of the door is selectively accomplished by application of a heavy force or a light force.

6. The combination with an automotive vehicle having a door and a bolt for holding the door closed, resisting means opposing opening of the door after the bolt is released and means to vary the resistance of the resisting means when the vehicle speed is varied.

7. In an automotive vehicle door construction, a check acting to restrain movement of the door from closed position, said check being operable at all times to allow the door to move to open position, and vehicle speed controlled means operable to vary the force required to actuate the check to door releasing position.

8. In an automotive vehicle door construction, a door movable to open and closed position, means to restrain movement of the door from closed to open position and operable at all times to permit the door to open and vehicle speed influenced means operable to control the force required to actuate the door restraining means.

9. In an automotive vehicle construction, a frame member, a door member hinged to the frame member, a bolt on one of the members movable to engage the other member to hold the door member closed, means to restrain opening movement of the door after the bolt is released, and means whereby the speed of the vehicle determines the force required to overcome the restraining means.

10. In an automotive vehicle door construction, a door movable to open and closed position, means to restrain movement of the door to open position, and vehicle speed influenced means to increase the restraining effect when the vehicle speed exceeds a predetermined rate and permitting easy overcoming of the restraining means when the vehicle speed is less than a predetermined rate.

11. In an automotive vehicle door construction, means operable to restrain opening movement of the door and means to vary the force required to actuate the restraining means, said force varying means including an electro-magnet and one or more circuits therefor including a door movement operated switch and a vehicle speed responsive circuit closer.

12. In an automotive vehicle door construction, a door mounted for movement to open and closed positions, means to restrain movement of the door to open position, said means including an electro-magnet and one or more circuits therefor, a vehicle speed controlled member, means whereby the vehicle speed controlled member controls the circuit and means whereby the electro-magnet controls the force required to overcome the restraining means.

13. In an automotive vehicle construction, a body member, a door member movable on the body member, means to restrain opening movement of the door, vehicle speed controlled means effective to permit easy overcoming of the restraining means under a predetermined speed rate of the vehicle but preventing easy opening under other speed conditions of the vehicle.

14. In an automotive vehicle construction, a body member having a door opening, a door member movably mounted on the body member and in one position closing the door opening, a check member movably mounted on one of the members, a trip member mounted on the other members and disposed in the path of the check member and engageable by the check member when the door is moved, a restraining member in the path of the check member when the latter is moved by the trip member and vehicle speed controlled means for moving the restraining member out of the path of the check member.

BURNIE J. CRAIG.